US006377383B1

(12) United States Patent
Whitehead et al.

(10) Patent No.: US 6,377,383 B1
(45) Date of Patent: Apr. 23, 2002

(54) OPTICAL SWITCHING BY CONTROLLABLE FRUSTRATION OF TOTAL INTERNAL REFLECTION

(75) Inventors: Lorne A. Whitehead; Robin John Noel Coope; Andrzej Kotlicki, all of Vancouver (CA)

(73) Assignee: The University of British Columbia, Vancouver (CA)

(*) Notice: Subject to any disclaimer, the term of this patent is extended or adjusted under 35 U.S.C. 154(b) by 0 days.

(21) Appl. No.: 09/449,756

(22) Filed: Nov. 26, 1999

Related U.S. Application Data

(63) Continuation-in-part of application No. 08/923,431, filed on Sep. 4, 1997, now Pat. No. 5,999,307.

(51) Int. Cl.[7] .............................................. G02B 26/08
(52) U.S. Cl. ....................................... 359/222; 359/223
(58) Field of Search ................................ 359/222, 223, 359/224, 298, 315, 318, 320, 833, 896; 385/16, 18, 36

(56) References Cited

U.S. PATENT DOCUMENTS 3,291,554 A    12/1966    Price
3,556,638 A    1/1971    Banks et al.

(List continued on next page.)

FOREIGN PATENT DOCUMENTS

DE    3720861 A    3/1989
DE    4343808 A    6/1995

(List continued on next page.)

OTHER PUBLICATIONS

"Surface Property Changes Induced In Poly(1–Hexene) Elastomer By High Energy Ion Irradition", Carlson et al, Proc. 4th Intl. Conf. on Ion Bean Modification of Materials, Ithaca, NY, Jul. 16–20, 1984 pp. 507–512.

(List continued on next page.)

*Primary Examiner*—Cassandra Spyrou
*Assistant Examiner*—Jennifer Winstedt
(74) *Attorney, Agent, or Firm*—Oyen Wiggs Green & Mutala

(57) ABSTRACT

An optical switch for controllably switching an interface between a reflective state in which incident light undergoes total internal reflection and a non-reflective state in which total internal reflection is prevented. In one such switch an elastomeric dielectric has a stiffened surface portion. A separator positioned between the interface and the stiffened surface portion maintains a gap there-between. A voltage source applies a variable voltage potential between electrodes on the interface and stiffened surface portion respectively. The applied voltage potential moves the stiffened surface portion into optical contact with the interface, producing the non-reflective state. In the absence of a voltage potential the separator moves the stiffened surface portion away from optical contact with the interface, producing the reflective state. In another such switch a cell contains a fluid. One side of the cell forms the light incident interface. A membrane is suspended in the fluid. One pair of electrodes is applied to opposite sides of the membrane. Another electrode pair is applied to the cell's interface side and to the cell's opposite side. A variable voltage potential is applied between selected ones of the electrodes. Application of the voltage potential between selected ones of the membrane and cell electrodes moves the membrane into optical contact with the interface, producing the non-reflective state. Application of the voltage potential between other selected ones of the membrane and cell electrodes moves the membrane away from optical contact with the interface, producing the reflective state.

38 Claims, 5 Drawing Sheets

U.S. PATENT DOCUMENTS

| | | |
|---|---|---|
| 3,571,511 A | 3/1971 | Myer |
| 3,612,653 A | 10/1971 | Rajchman |
| 3,698,793 A | 10/1972 | Tellerman |
| 3,730,608 A | 5/1973 | Castegnier |
| 3,746,785 A | 7/1973 | Goodrich |
| 3,796,480 A | 3/1974 | Preston, Jr. et al. |
| 3,987,668 A | 10/1976 | Popenoe |
| 4,113,360 A | 9/1978 | Baur et al. |
| 4,135,960 A | 1/1979 | Shuppert et al. |
| 4,148,563 A | 4/1979 | Herbert |
| 4,156,745 A | 5/1979 | Hatzakis et al. |
| 4,165,155 A | 8/1979 | Gordon, II et al. |
| 4,249,814 A | 2/1981 | Hull et al. |
| 4,324,456 A | 4/1982 | Dalisa |
| 4,391,490 A | 7/1983 | Hartke |
| 4,420,897 A | 12/1983 | Castleberry |
| 4,448,622 A | 5/1984 | Duchane et al. |
| 4,536,061 A | 8/1985 | Nishimura |
| 4,617,608 A | 10/1986 | Blonder et al. |
| 4,714,326 A | 12/1987 | Usui et al. |
| 4,723,834 A | 2/1988 | Van de Venne et al. |
| 5,045,847 A | 9/1991 | Tarui et al. |
| 5,147,519 A | 9/1992 | Legge |
| 5,221,987 A | 6/1993 | Laughlin |
| 5,235,463 A | 8/1993 | Broussoux et al. |
| 5,301,009 A | 4/1994 | Shurtz, II |
| 5,319,491 A | 6/1994 | Selbrede |
| 5,425,710 A | 6/1995 | Khair et al. |
| 5,455,709 A | 10/1995 | Dula, III et al. |
| 5,504,618 A | 4/1996 | Hirs et al. |
| 5,555,327 A | 9/1996 | Laughlin |
| 5,555,558 A | 9/1996 | Laughlin |
| 5,561,541 A | 10/1996 | Sharp et al. |
| 5,566,260 A | 10/1996 | Laughlin |
| 5,608,837 A | 3/1997 | Tai et al. |
| 5,841,916 A | 11/1998 | Laughlin |
| 5,959,777 A | 9/1999 | Whitehead |

FOREIGN PATENT DOCUMENTS

| | | |
|---|---|---|
| EP | 204427 A | 12/1986 |
| EP | 728799 A1 | 8/1996 |
| EP | 797127 A | 9/1997 |
| GB | 2265024 A | 9/1993 |
| JP | 54057576 | 5/1979 |
| JP | 55-525 | 1/1980 |
| JP | 59078816 | 5/1984 |
| JP | 60038130 | 2/1985 |
| JP | 60-185918 | 9/1985 |
| JP | 2-254405 | 10/1990 |
| JP | 5-281481 | 10/1993 |
| WO | WO 99/12069 | 3/1999 |
| WO | WO 99/15595 | 4/1999 |
| WO | WO 99/28890 | 6/1999 |

OTHER PUBLICATIONS

"Patented fiber switch revs speed, cuts cost", George Kotelly, in "Lightwave" Oct., 1995 web site publication of PennWell Publishing Co., Tulsa, OK.

"Elastomeric Light Valves", Qin et al, Advanced Materials 1997, 9, No. 5, pp. 407–410.

3M Fluorinert™ Electronic Liquid brochure, http://www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

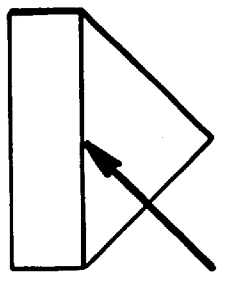
FIG. 1A
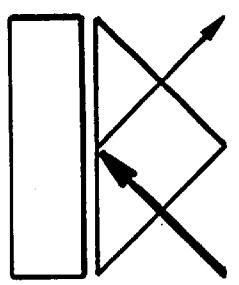
FIG. 1B
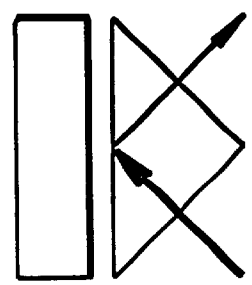
FIG. 1C
FIG. 1D
PRIOR ART
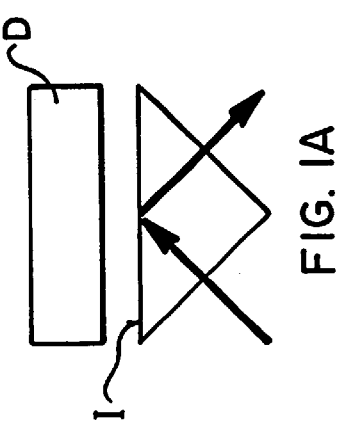
FIG. 2A
FIG. 2B
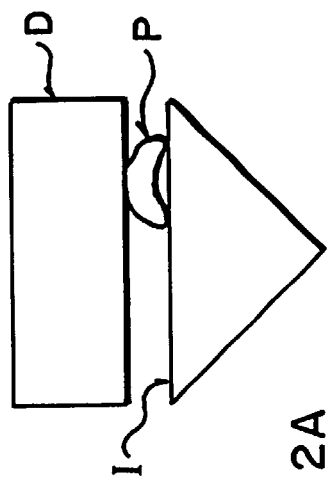
PRIOR ART
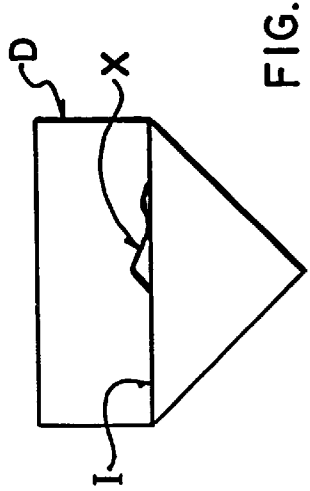
FIG. 2C
FIG. 2D
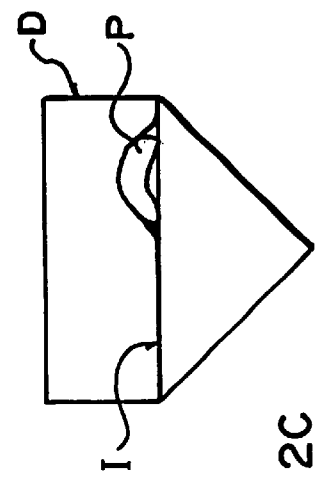
PRIOR ART

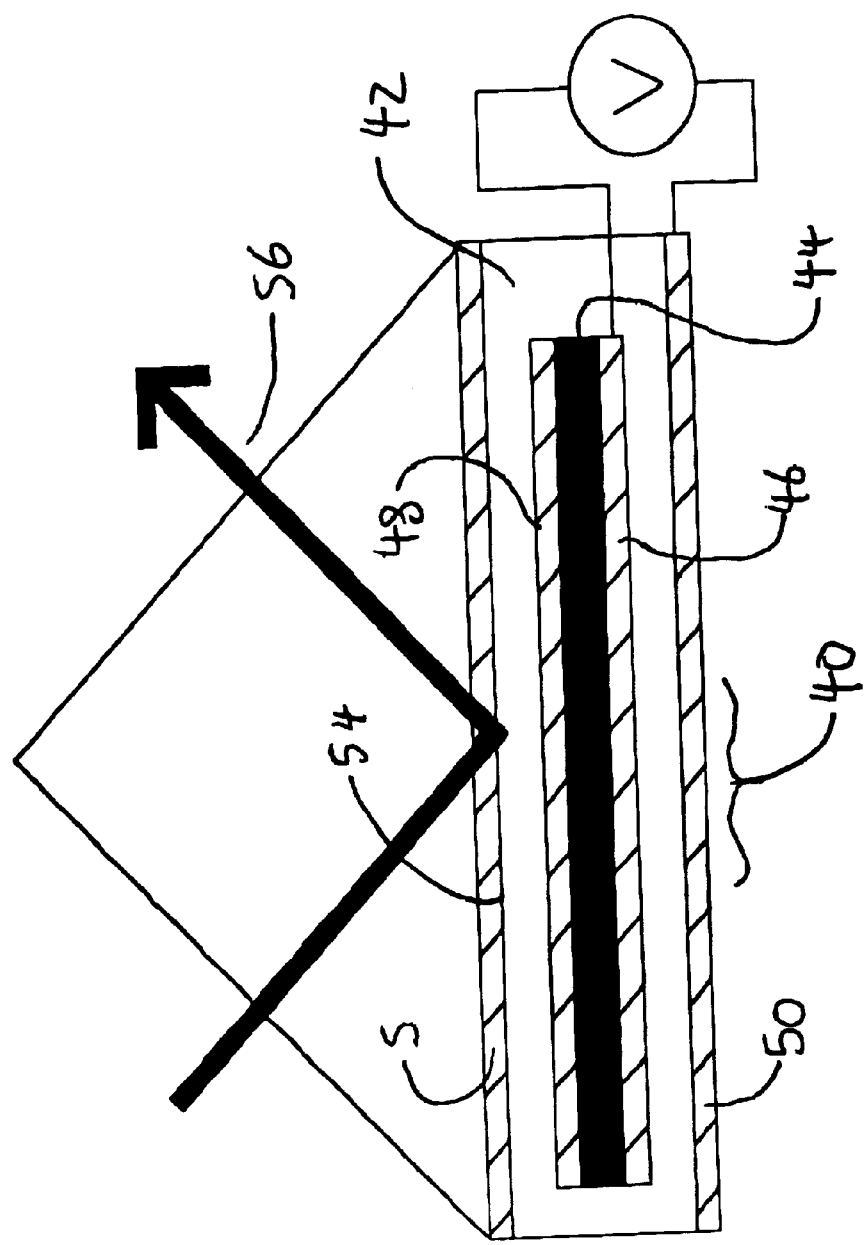

OPTICAL SWITCHING BY CONTROLLABLE FRUSTRATION OF TOTAL INTERNAL REFLECTION

REFERENCE TO RELATED APPLICATION

This is a continuation-in-part of U.S. application Ser. No. 08/923,431 filed Sep. 4, 1997, now Pat. No. 5,999,307

TECHNICAL FIELD

This application pertains to a method and apparatus for frustrating the phenomenon of total internal refection in a continuously variable, easily controllable manner.

BACKGROUND

It is well known that light travels at different speeds in different materials. The change of speed results in refraction. The relative refractive index between two materials is given by the speed of an incident light ray divided by the speed of the refracted ray. If the relative refractive index is less than one, as in the case when light passes from glass block to air, then a light ray will be refracted towards the surface. Angles of incidence and reflection are normally measured from a direction normal to the interface. At a particular angle of incidence "i", the refraction angle "r" becomes 90° as the light runs along the block's surface. The critical angle "i" can be calculated, as sin i=relative refractive index. If "i" is made even larger, then all of the light is reflected back inside the glass block and none escapes from the block. This is called total internal reflection. Because refraction only occurs when light changes speed, it is perhaps not surprising that the incident radiation emerges slightly before being totally internally reflected, and hence a slight penetration (roughly one micron) of the interface, called "evanescent wave penetration" occurs. By interfering with (i.e. scattering and/or absorbing) the evanescent wave one may prevent (i.e. "frustrate") the total internal reflection phenomenon.

In a number of applications, it is desirable to controllably frustrate the phenomenon of total internal reflection. For example, if total internal reflection is occurring at an interface "I" as shown in FIG. 1A, the extent of such reflection can be reduced by placing a dielectric material "D" close to interface I, such that dielectric D interacts with the evanescent wave penetrating beyond interface I, as shown in FIGS. 1B, 1C, and 1D, in which the extent of frustration of total internal reflection is gradually increased, culminating in complete frustration (FIG. 1D).

It is desirable that dielectric D be an elastomeric material. Inevitably, at least some foreign particles "P" (FIG. 2A) are trapped between dielectric D and interface I; and/or, the opposing surfaces of dielectric D and interface I have at least some dimensional imperfections "X" (FIG. 2B) which prevent attainment of a high degree of surface flatness over substantial opposing areas of both surfaces. Such foreign particles, or such surface imperfections, or both, can prevent attainment of "optical contact" between dielectric D and interface I. Optical contact brings dielectric D substantially closer than one micron to interface I, thereby scattering and/or absorbing the evanescent wave adjacent interface I, thus preventing the capability of interface I to totally internally reflect incident light rays. If dielectric D is formed of an elastomeric material, the aforementioned adverse effects of such foreign particles and/or surface imperfections are localized, thereby substantially eliminating their impact on attainment of the desired optical contact. More particularly, as seen in FIGS. 2C and 2D, the elastomeric nature of dielectric D allows dielectric D to closely conform itself around foreign particle P and around surface imperfection X, such that optical contact is attained between dielectric D and interface I except at points very close to foreign particle P and around surface imperfection X. Since such points typically comprise only a very small fraction of the opposing surface areas of dielectric D and interface I, sufficiently substantial optical contact is attained to facilitate frustration of total internal reflection as described above.

Elastomeric materials vary considerably in surface tack, but virtually all are too tacky to be practical for this application without modification. This is because most elastomeric materials are sufficiently soft and have enough surface energy that the material can deform into intimate "atomic contact" with the atomic scale structure present at any surface. The resulting Van der Waals bonding is sufficient to make it difficult to remove the material from the surface.

It is desirable to provide a means for controlling frustration of total internal reflection by varying an interfacial pressure applied between dielectric D and interface I; and, in general, it is desirable to minimize the applied pressure. The aforementioned Van der Waals bonding can require negative pressures of order $10^4$ Pascals for release, which is desirably reduced. Further, it is desirable to separate dielectric D and interface I by an amount exceeding the evanescent wave zone when the applied pressure is removed. The present invention addresses these desires.

SUMMARY OF INVENTION

The invention provides an optical switch for controllably switching an interface between a reflective state in which light incident upon the interface undergoes total internal reflection and a non-reflective state in which total internal reflection is prevented at the interface. In one embodiment, the switch incorporates a preferably elastomeric dielectric having a stiffened surface portion. A separator is positioned between the interface and the stiffened surface portion to maintain a gap there-between. Electrodes are applied to the interface and stiffened surface portion respectively. A voltage source controllably applies a variable voltage potential between the electrodes. Application of a voltage potential between the electrodes moves the stiffened surface portion into optical contact with the interface, producing the non-reflective state at the interface. In the absence of a voltage potential between the electrodes the separator moves the stiffened surface portion away from optical contact with the interface, producing the reflective state at the interface.

The separator may be a plurality of stand-offs provided at spaced intervals between the interface and the stiffened surface portion to maintain the gap at about 1 micron in the absence of a voltage potential between the electrodes. Advantageously, the stand-offs are an integral part of the interface.

The dielectric's surface may be stiffened by applying to it a thin film material having a Young's Modulus value substantially less than the dielectric's Young's Modulus value. Alternatively, and to better enable the dielectric's surface to flex in the vicinity of the standoffs, the dielectric's surface may be stiffened by applying a thin layer of hard particles thereto.

In another embodiment, the optical switch incorporates a cell containing a fluid. One side of the cell forms the interface upon which light is incident. A membrane is suspended in the fluid. One pair of electrodes is applied to opposite sides of the membrane; and, another electrode pair is applied to the side of the cell forming the interface and to the cell's opposite side. A variable voltage potential is applied between selected ones of the electrodes. Application of the voltage potential between selected ones of the membrane and cell electrodes moves the membrane into optical contact with the interface, producing the non-reflective state at the interface. Application of the voltage potential between other selected ones of the membrane and cell electrodes moves the membrane away from optical contact with the interface, producing the reflective state at the interface.

BRIEF DESCRIPTION OF DRAWINGS

FIGS. 1A, 1B, 1C and 1D show various stages in frustration of the total internal reflection phenomenon at interface "I" as dielectric "D" is gradually moved toward interface I.

FIGS. 2A and 2B respectively depict a foreign particle "P" and a surface imperfection "X" preventing attainment of optical contact between interface I and dielectric D.

FIGS. 2C and 2D respectively depict attainment of substantial optical contact between interface I and dielectric D notwithstanding foreign particle P or surface imperfection X if dielectric D is an elastomeric material.

FIG. 3A depicts the "off" state in which stand-offs maintain a gap between the interface and dielectric in the absence of an applied pressure, allowing total internal reflection to occur. FIG. 3B depicts the "on" state in which electrodes applied to the interface and dielectric are actuated to apply a controllably variable pressure, closing the gap sufficiently to frustrate total internal reflection.

FIGS. 5A and 5B depict an alternate optical switch embodiment of the invention, with FIG. 5A depicting the "off" state in which total internal reflection occurs, and FIG. 5B depicting the "on" state in which total internal reflection is frustrated.

DESCRIPTION

Figure 3A:
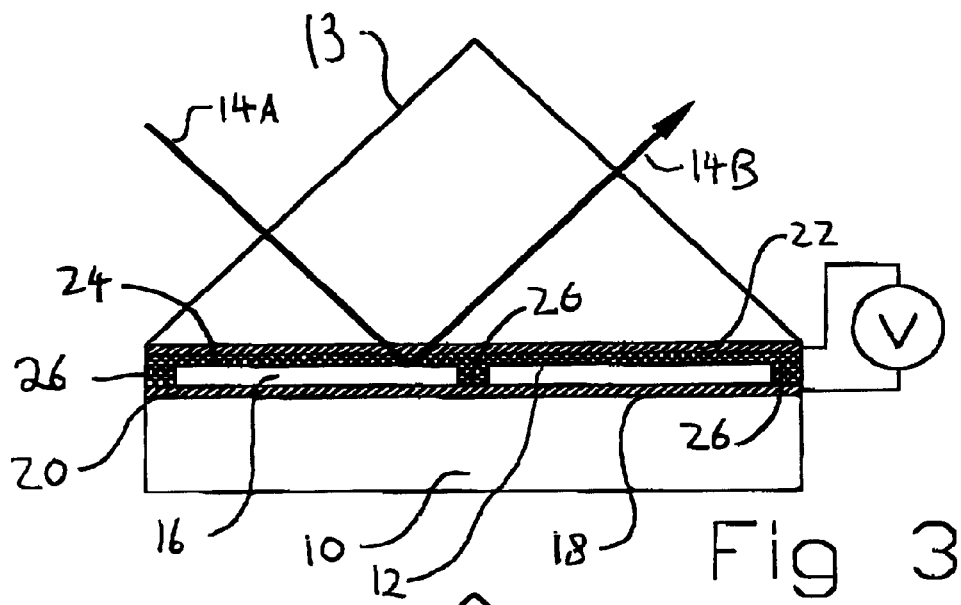
FIGS. 3A and 3B depict a stiff-surfaced non-adhesive elastomeric dielectric positioned adjacent an interface in accordance with one optical switch embodiment of the invention.

FIG. 3A depicts an elastomeric dielectric 10 positioned adjacent interface 12. As depicted, interface 12 is one face of a prism 13. Prism 13 may be but one of a very large number of 90° prisms in a sheet of prismatic film such as 2370 3M optical lighting film. Alternatively, prism 13 may be a 55° prism formed of a high refractive index material. However, prisms are not essential to the invention; interface 12 could alternatively be one face of a slab waveguide or other structure capable of totally internally reflecting light rays at interface 12. Light rays incident (14A) upon interface 12 are totally internally reflected (14B) because air gap 16 between the opposing surfaces of dielectric 10 and interface 12 is large enough to prevent optical contact between the opposing surfaces (i.e. gap 16 is substantially greater than one micron). As hereinafter explained, dielectric 10 is fabricated such that the Young's Modulus E of dielectric 10 varies as a function of distance from the surface of dielectric 10 adjacent interface 12, such that a portion 18 of dielectric 10 near the surface is substantially stiffer than in the remaining portions of dielectric 10.

The stiffened surface portion 18 of dielectric 10 prevents attainment of the aforementioned Van der Waals bonding between dielectric 10 and interface 12, since such bonding occurs only if dielectric 10 is sufficiently deformable. Roughly speaking, the Young's Modulus of a material (a measure of the material's stiffness) must be less than the Van der Waals bond energy per unit area divided by a characteristic dimension associated with the material's surface roughness, in order for substantial atomic contact to occur. If dielectric 10 and interface 12 are sufficiently smooth to exhibit total internal reflection (i.e. if the surface roughness dimensions characterizing dielectric 10 and interface 12 are substantially less than one micron) and if dielectric 10 and interface 12 exhibit typical surface energies, then undesirable adhesion occurs between dielectric 10 and interface 12 if the Young's Modulus of dielectric 10 is less than about $10^6$ Pascals, which is the case for elastomeric materials. Hence, by increasing the Young's Modulus of elastomeric dielectric 10 at the surface of dielectric 10 one may stiffen that surface sufficiently to prevent undesirable adhesion between dielectric 10 and interface 12.

The aforementioned surface stiffening should be such that the surface of dielectric 10 can assist in achieving a predictable, reproducible degree of frustration of total internal reflection which varies as a function of the pressure applied between dielectric 10 and interface 12. Preferably, under low positive interfacial pressure, the degree of frustration of total internal reflection is low, and air gap 16 retains a well defined average width of slightly over one micron. This is important, particularly if the interfacial pressure is to be created by electrostatic attraction, as such narrow width air gaps can support large electric fields due to the "Paschen effect", and these large fields can be produced with comparatively low voltages, due to the small gap width.

One method of stiffening the surface of elastomeric dielectric 10 is to prepare a uniform, smooth-surfaced elastomeric material, and then treat that material in a manner which stiffens a thin surface portion of the material. For example, an elastomeric material can be initially hardened ("stabilized") by exposure to ultraviolet light, or by application of chemical cross linking agents. A thin film formed of a material having a Young's Modulus much higher than that of the elastomeric material can then be deposited on the elastomeric material's stabilized surface. As one example, an indium tin oxide film can be deposited on a stabilized elastomeric dielectric surface. The deposited film not only stiffens thin surface portion 18 of elastomeric dielectric 10 as aforesaid, but also functions as a transparent surface electrode 20 for applying a variable electrostatic pressure between dielectric 10 and interface 12 as hereinafter explained. An opposing electrode 22 can be applied to interface 12 in well known fashion. An insulating film 24 such as zinc oxide or vacuum deposited parylene can also be applied to the stabilized surface of dielectric 10 to act as an insulator between the aforementioned electrodes and/or to stiffen dielectric 10 to prevent Van der Waals bonding and thus prevent undesirable adhesion between dielectric 10 and interface 12.

Figure 3B:
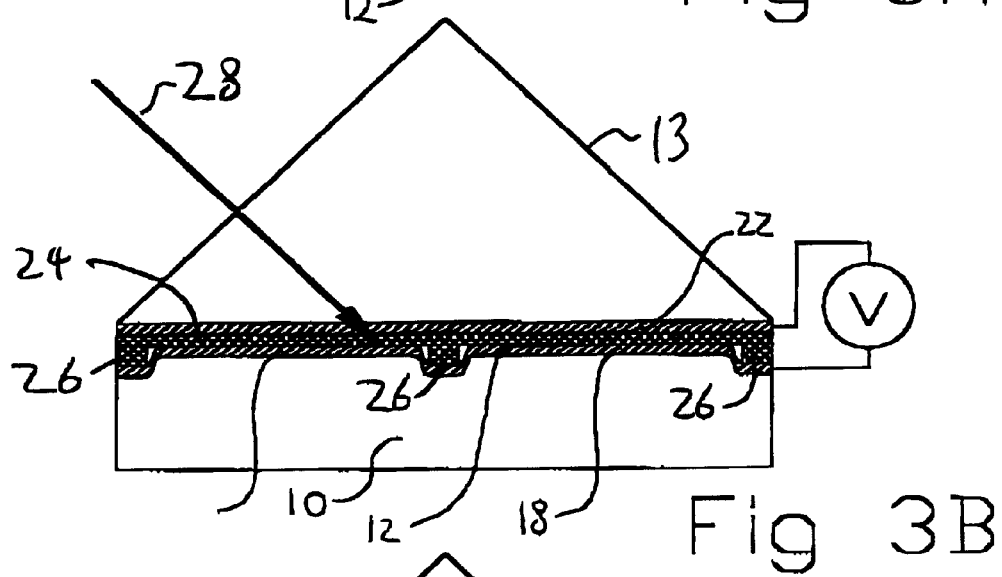

As seen in FIGS. 3A and 3B, a separator such as a plurality of rigid stand-offs 26 are provided at spaced intervals between dielectric 10 and interface 12; and, more particularly, between electrodes 20, 22. Stand-offs 26 are each about 1 micron high and serve to maintain gap 16 between dielectric 10 and interface 12 at about 1 micron if voltage source "V" is not actuated to apply a voltage between electrodes 20, 22 which is sufficient to cause the attractive electrostatic pressure between electrodes 20, 22 to move electrode 20 and dielectric 10 into gap 16 and into optical contact with interface 12 as seen in FIG. 3B. Thus, stand-offs 26 serve to maintain gap 16 between dielectric 10 and interface 12 in the absence of an applied pressure, allowing total internal reflection to occur as illustrated by reflected ray 14B in FIG. 3A. However, when a voltage is applied as aforesaid to move electrode 20 and the stiffened bulk surface portion 18 of dielectric 10 into gap 16, total internal reflection is frustrated as illustrated by non-reflected ray 28 in FIG. 3B. The invention thus provides an optical switch, with FIGS. 3A and 3B respectively depicting the "off" and "on" states.

The embodiment of the invention described above with reference to FIGS. 3A and 3B may "over stiffen" surface portion 18 of dielectric 10, leaving dielectric 10 with insufficient surface flexibility for adequate deformation of dielectric 10 in regions proximate to stand-offs 26. Consequently, when a voltage is applied as aforesaid to move dielectric 10 into gap 16, dielectric 10 may not extend sufficiently into gap 16 to frustrate total internal reflection in regions proximate to stand-offs 26, causing visually perceptible light or dark spots to appear in the vicinity of stand-offs 26. An alternate stiffening method can be used to overcome this potential deficiency.

Figure 3C:
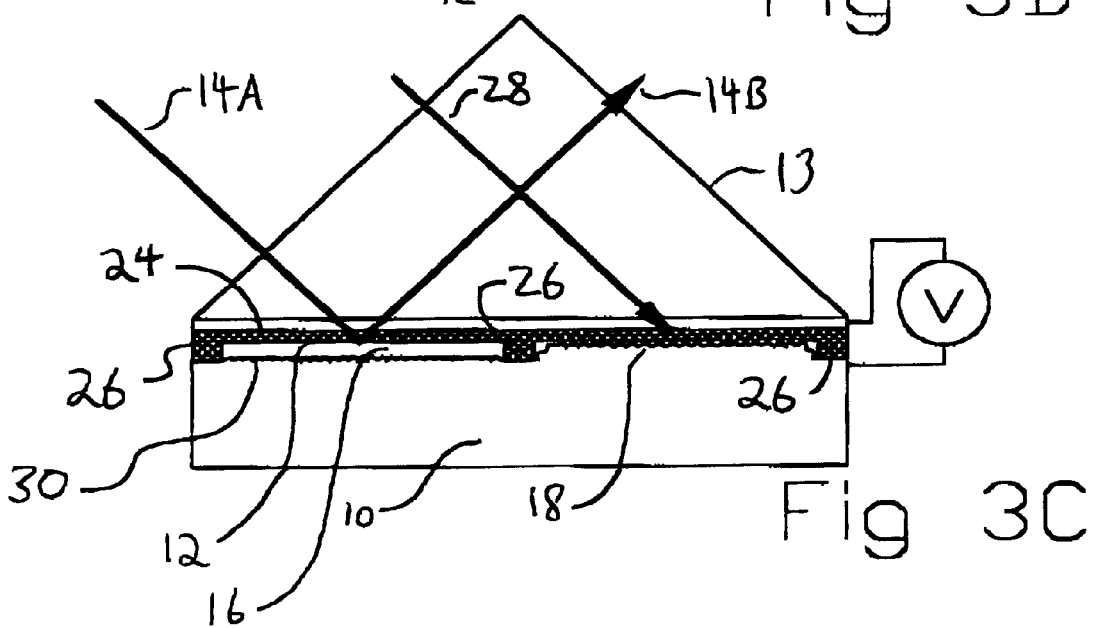
FIG. 3C is similar to FIGS. 3A and 3B, but depicts an alternate technique for stiffening the surface of the elastomeric dielectric by applying a layer of hard, sub optical size particles thereto. This technique resists undesirable adhesion between the dielectric and interface without impairing the dielectric's ability to flex in regions proximate to the stand-offs. The left hand portion of FIG. 3C depicts the "off" state in which stand the offs maintain a gap between the interface and dielectric in the absence of an applied pressure, allowing total internal reflection to occur. The right hand portion of FIG. 3C depicts the "on" state in which an applied pressure has closed the gap sufficiently to frustrate total internal reflection.

Specifically, as shown in FIG. 3C, a layer of hard, suboptical size (i.e. less than 1 micron in diameter) particles 30 can be applied to the surface of dielectric 10 to produce stiffened surface portion 18. Particles 30 can be made from any one of a number of substances, including ceramics or hard polymers, provided particles 30 are sufficiently small that the bulk of the particulate layer is able to flex sufficiently to extend inside the evanescent wave zone in regions proximate to stand-offs 26 when pressure is applied to move dielectric 10 into gap 16 as aforesaid. The FIG. 3C embodiment thus provides another optical switch, with the left and right hand portions of FIG. 3C respectively depicting the "off" and "on" states.

The height of stand-offs 26 and/or the spacing between adjacent pairs of stand-offs 26 can be altered during fabrication of optical switches embodying the invention to vary the force which stand-offs 26 exert in the absence of an applied pressure. Preferably, only the spacing between adjacent pairs of stand-offs 26 is altered, since this does not affect the attractive electrostatic pressure exerted between electrodes 20, 22 by actuation of voltage source "V". Standoffs 26 can be directly fabricated on the surface of interface 12, for example by photo-developing a film applied to the surface of interface 12, with the film's thickness determining the height of stand-offs 26.

Figure 4:
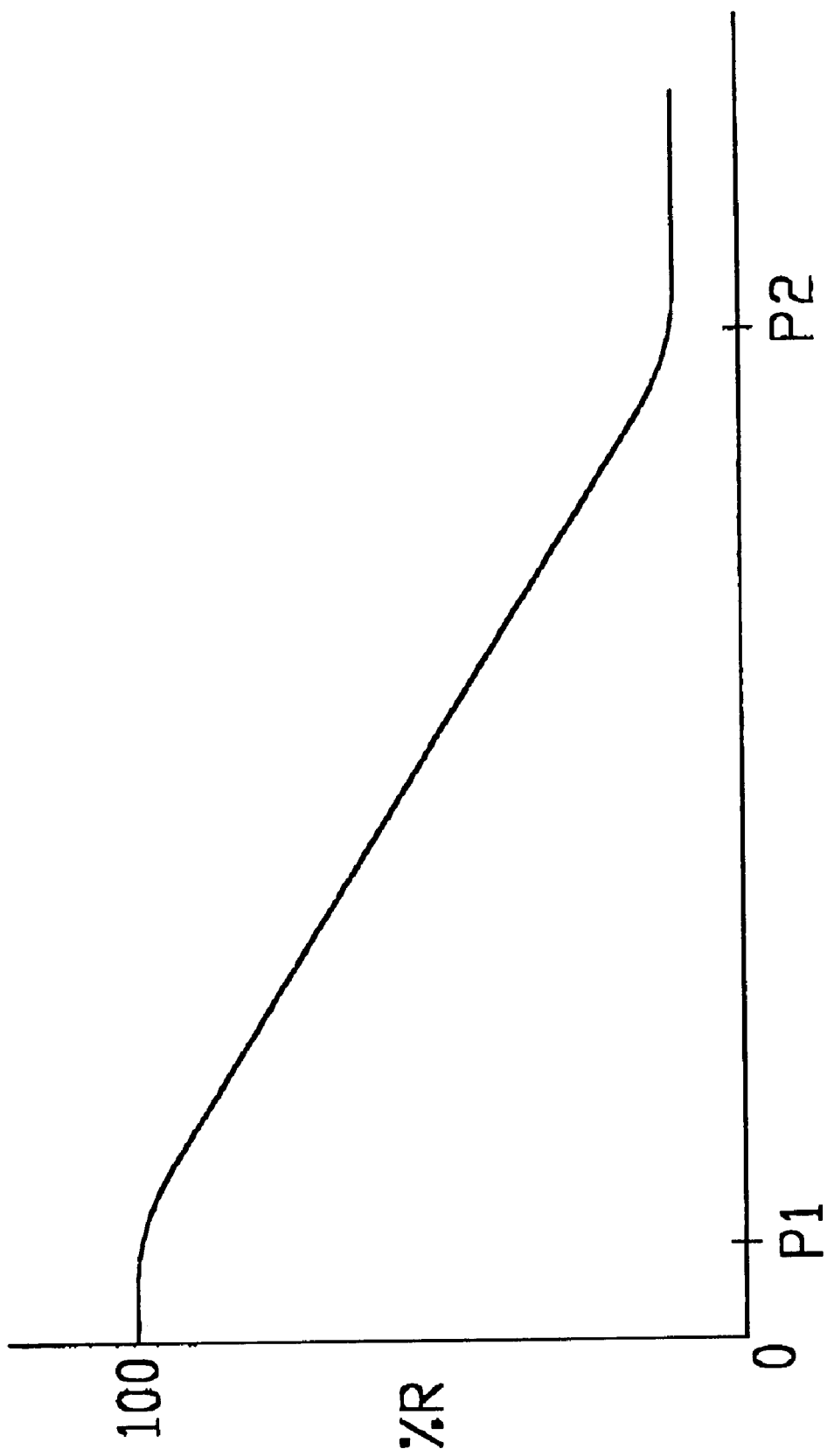
FIG. 4 is a graph on which percentage surface reflectivity is plotted as a function of pressure applied between the dielectric and interface of depicted in FIGS. 3A and 3B.

A desirable property of the optical switches depicted in FIGS. 3A, 3B and 3C is that a gradual increase in the attractive electrostatic pressure exerted between electrodes 20, 22 by actuation of voltage source "V" produces a corresponding gradual increase in the extent of frustration of total internal reflection at interface 12. More particularly, by suitably varying the voltage applied between electrodes 20, 22 one may vary the displacement between stiffened surface 18 on dielectric 10 and interface 12 within a continuously variable range of optical contact values, thereby attaining any desired degree of frustration of the capability of interface 12 to totally internally reflect incident light rays. FIG. 4 graphically illustrates the resultant range of percentage reflectivity as a function of the attractive electrostatic pressure exerted between electrodes 20, 22. In FIG. 4, "P1" denotes the minimum pressure at which substantially all incident light is totally internally reflected, and "P2" denotes the maximum pressure at which total internal reflection is substantially frustrated (i.e. substantially no incident light is totally internally reflected).

In the embodiments of 3A, 3B and 3C, the Young's Modulus is increased in the surface portion 18 of dielectric 10. More particularly, in surface portion 18 E>a/d, where E is the Young's Modulus within surface portion 18, a is the bond energy per unit area due to the Van der Waals force between interface 12 and dielectric 10, and d is a dimension characteristic of surface roughness of interface 12. A comparable result can be obtained by reducing a, as will now be explained in relation to FIGS. 5A and 5B.

Figure 5B:
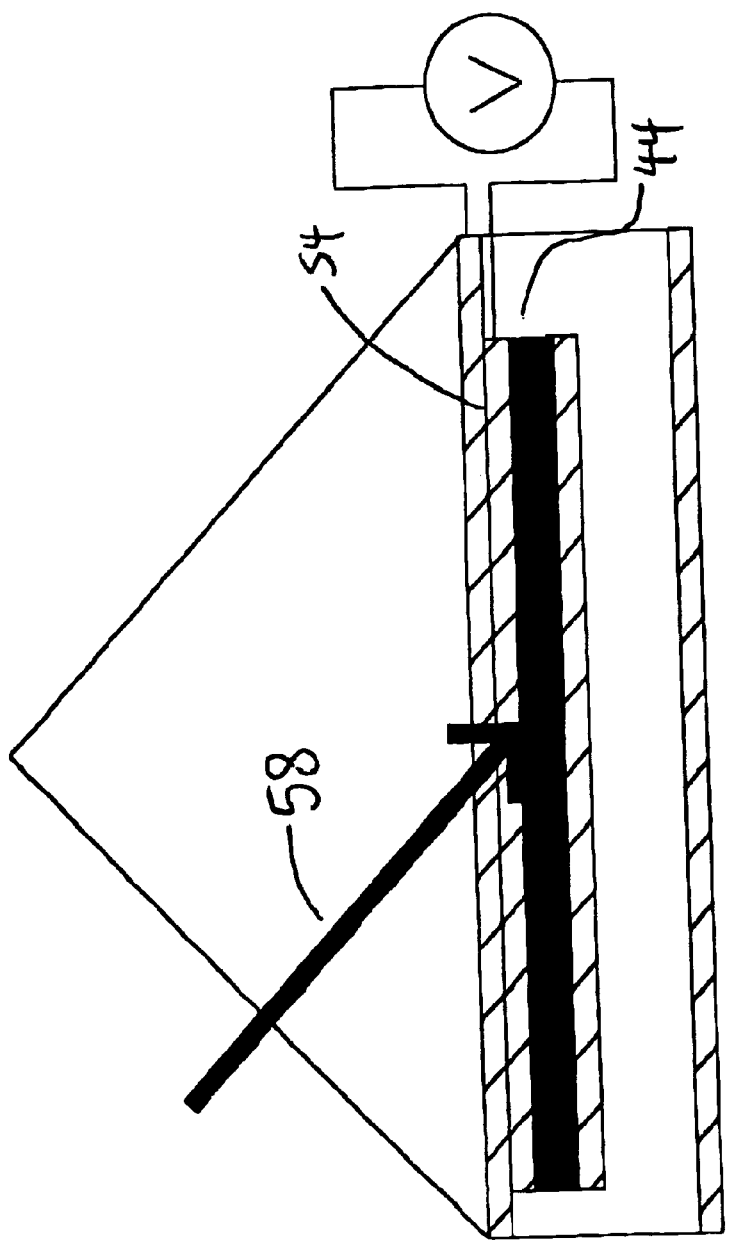

FIG. 5A depicts a cell 40 filled with fluid 42 having a low (less than about 1.3) index of refraction, such as 3M Flourinert™. A planar elastomeric membrane 44 bearing a first pair of opposed upper and lower (as viewed in FIGS. 5A and 5B) surface electrodes 46, 48 is suspended within fluid 42. A second pair of insulated electrodes 50, 52 are provided on the opposed internal upper and lower surfaces of cell 40. The thickness "T" of membrane 44 and its electrodes 46, 48 is a few microns less than the width "W" of cell 40 (i.e. the perpendicular displacement between insulated electrodes 50, 52) so that reasonable electrostatic pressures can be produced between adjacent electrodes to move membrane 44, as hereinafter explained. Both the length and the depth of membrane 44 and its electrodes 46, 48 are greater than the width "W" of cell 40, so that membrane 44 remains oriented as shown, with electrodes 46, 48 generally parallel to insulated electrodes 50, 52.

Total internal reflection at interface 54 is controlled by means of voltage source "V". Specifically, if voltage source "V" is actuated to apply an attractive electric field between electrodes 46, 50 while electrodes 48, 52 are at maintained at equal potential, then membrane 44 is repelled away from and does not contact interface 54 as seen in Fig. 5A, thus allowing total internal reflection to occur at interface 54 as illustrated by reflected ray 56. If voltage source "V" is actuated to apply an attractive electric field between electrodes 48, 52 while electrodes 46, 50 are maintained at equal potential, then membrane 44 moves upwardly (as viewed in FIG. 5B) through fluid 42 into optical contact with interface 54, thus frustrating total internal reflection at interface 54 as illustrated by non-reflected ray 58 in FIG. 5B. Cell 40 thus constitutes an optical switch, with FIGS. 5A and 5B respectively depicting the "off" and "on" states. Fluid 42 reduces the relative surface energy a, facilitating optical contact at interface 54 without adhesion. Use of a low refractive index fluid 42 in combination with a high refractive index optical medium 60 (e.g. a high index polymer or other transparent material having an index of refraction greater than about 1.65) reduces the critical angle "i" at which total internal reflection occurs, thus increasing the range of angles at which incident light can be totally internally reflected. This is an important factor, since it directly affects the acceptable range of viewing angles of a display incorporating a plurality of optical switches (i.e. cells 40).

As will be apparent to those skilled in the art in the light of the foregoing disclosure, many alterations and modifications are possible in the practice of this invention without departing from the spirit or scope thereof. For example, although dielectric 10 is preferably a silicone elastomer, it need not necessarily be an "elastomer"; it is sufficient for the bulk dielectric material to be a reasonably flexible substance, such as Teflon™. Further, persons skilled in the art will appreciate that the "on" and "off" optical switch states are arbitrary. Thus, the state depicted in any of FIG. 3A, the left side of FIG. 3C, or 5A could be designated as the "on" state, with the opposite state depicted in FIG. 3B, the right side of FIG. 3C, or 5B respectively being designated as the "off" state. Similarly, different combinations of attractive or repulsive electric fields can be applied between one or the other of electrodes 46, 48 and one or the other of electrodes 50, 52 to move membrane 44 into or out of optical contact with interface 54. Accordingly, the scope of the invention is to be construed in accordance with the substance defined by the following claims.

What is claimed is:

1. Apparatus for controllably switching an interface between a reflective state in which light incident upon said interface undergoes total internal reflection and a non-reflective state in which total internal reflection is prevented at said interface, said apparatus comprising:
    (a) a dielectric having a stiffened surface portion;
    (b) a separator positioned between said interface and said stiffened surface portion to maintain a gap therebetween;
    (c) a first electrode on said interface;
    (d) a second electrode on said stiffened surface portion; and,
    (e) a voltage source for controllably applying a variable voltage potential between said electrodes; wherein:
        (i) application of said voltage potential between said electrodes moves said stiffened surface portion into optical contact with said interface, producing said non-reflective state at said interface;
        (ii) in the absence of said voltage potential between said electrodes said separator moves said stiffened surface portion away from optical contact with said interface, producing said reflective state at said interface.

2. Apparatus as defined in claim 1, wherein E>a/d, where E is said stiffened portion's Young's Modulus, a is the bond energy per unit area due to Van der Waals bonding between said interface and said member, and d is a dimension characteristic of roughness of said interface.

3. Apparatus as defined in claim 2, wherein said stiffened portion's Young's Modulus is greater than about $10^6$ Pascals.

4. Apparatus as defined in claim 1, wherein said dielectric is an elastomer.

5. Apparatus as defined in claim 4, wherein said separator further comprises a plurality of stand-offs provided at spaced intervals between said interface and said stiffened surface portion.

6. Apparatus as defined in claim 5, wherein said gap is about 1 micron.

7. Apparatus as defined in claim 5, wherein said stand-offs each have a height of about 1 micron.

8. Apparatus as defined in claim 5, wherein said stand-offs are an integral part of said interface.

9. Apparatus as defined in claim 5, wherein said stiffened surface portion further comprises a thin layer of hard particles.

10. Apparatus as defined in claim 4, wherein said particles have an average diameter less than 1 micron.

11. Apparatus as defined in claim 4, wherein said stiffened surface portion further comprises a thin film material having a first Young's Modulus value, said elastomer having a second Young's Modulus value substantially less than said first Young's Modulus value.

12. Apparatus as defined in claim 11, wherein said thin film material is indium tin oxide.

13. Apparatus as defined in claim 11, wherein said thin film material further comprises said second electrode.

14. Apparatus as defined in claim 4, further comprising an insulator positioned between said electrodes.

15. Apparatus as defined in claim 14, wherein said insulator further comprises a thin film material.

16. Apparatus as defined in claim 15, wherein said insulator further comprises said stiffened surface portion.

17. Apparatus as defined in claim 1, wherein said dielectric is a silicone elastomer.

18. Apparatus as defined in claim 1, wherein said voltage source is controllable to move said stiffened surface portion into optical contact with said interface within a continuously variable range of optical contact values.

19. A method of controllably switching an interface between a reflective state in which light incident upon said interface undergoes total internal reflection and a non-reflective state in which total internal reflection is prevented at said interface, said method comprising:
    (a) producing said non-reflective state at said interface by controllably applying a variable voltage potential between said interface and an adjacent stiffened surface portion of a dielectric to move said stiffened surface portion into optical contact with said interface; and,
    (b) producing said reflective state at said interface by removing said voltage potential to move said stiffened surface portion away from optical contact with said interface.

20. A method as defined in claim 19, wherein said dielectric is an elastomer.

21. A method as defined in claim 20, wherein said dielectric is a silicone elastomer.

22. A method as defined in claim 20, further comprising forming a first electrode on said interface and forming a second electrode on said stiffened surface portion for application of said voltage potential between said electrodes.

23. A method as defined in claim 22, further comprising maintaining a gap between said interface and said stiffened surface portion in the absence of said applied voltage potential.

24. A method as defined in claim 23, wherein said gap is about 1 micron.

25. A method as defined in claim 23, further comprising maintaining said gap by positioning a separator between said interface and said stiffened surface portion.

26. A method as defined in claim 23, further comprising maintaining said gap by positioning a plurality of stand-offs between said interface and said stiffened surface portion.

27. A method as defined in claim 26, wherein said stand-offs each have a height of about 1 micron.

28. A method as defined in claim 26, further comprising forming said stand-offs integrally with said interface.

29. A method as defined in claim 26, further comprising depositing a thin layer of hard particles on said dielectric to form said stiffened surface portion.

30. A method as defined in claim 29, wherein said particles have an average diameter less than 1 micron.

31. A method as defined in claim 22, further comprising forming said stiffened surface portion integrally with said first electrode from a thin film material having a first Young's Modulus value, said elastomer having a second Young's Modulus value substantially less than said first Young's Modulus value.

32. A method as defined in claim 31, wherein said thin film material is indium tin oxide.

33. A method as defined in claim 22, further comprising forming an insulator between said electrodes.

34. A method as defined in claim 33, further comprising forming said insulator from a thin film material.

35. A method as defined in claim 33, further comprising forming said stiffened surface portion integrally with said insulator.

36. A method as defined in claim 20, further comprising forming said stiffened surface portion from a thin film material having a first Young's Modulus value, said elastomer having a second Young's Modulus value substantially less than said first Young's Modulus value.

37. A method as defined in claim 36, wherein said thin film material is indium tin oxide.

38. A method as defined in claim 19, further comprising varying said voltage potential to move said stiffened surface portion into optical contact with said interface within a continuously variable range of optical contact values.

* * * * *